(No Model.)

J. S. WALLACE.
FRAME FOR POWER DRILLING MACHINES.

No. 360,183. Patented Mar. 29, 1887.

WITNESSES:
C. Neveux
C. Sedgwick

INVENTOR:
J. S. Wallace
BY Munn & Co.
ATTORNEYS.

UNITED STATES PATENT OFFICE.

JOHN SHAW WALLACE, OF NELSONVILLE, OHIO.

FRAME FOR POWER DRILLING-MACHINES.

SPECIFICATION forming part of Letters Patent No. 360,183, dated March 29, 1887.

Application filed July 7, 1886. Serial No. 207,332. (No model.)

*To all whom it may concern:*

Be it known that I, JOHN SHAW WALLACE, of Nelsonville, in the county of Athens and State of Ohio, have invented a new and Improved Frame for Power Drilling-Machines, of which the following is a full, clear, and exact description.

The object of my invention is to provide a new and improved frame for power drilling-machines, and which is especially adapted to be used in mines where a quick adjustment of the frame is desirable.

The invention consists in various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
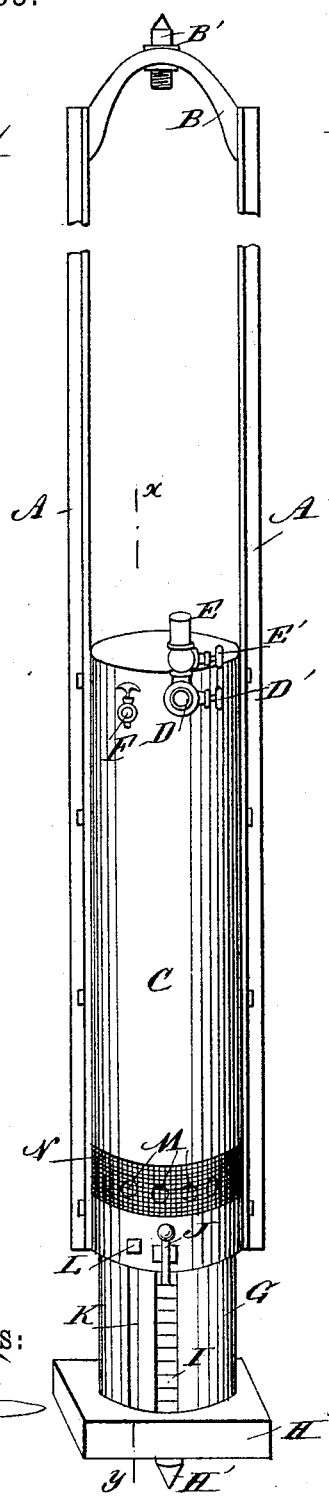
Figure 2:
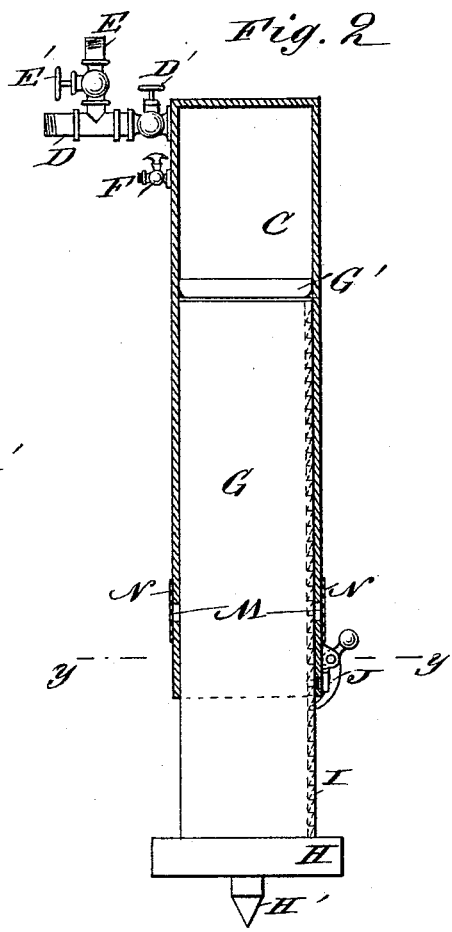
Figure 3:
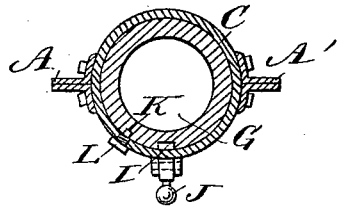

Figure 1 is a perspective view of my improvement. Fig. 2 is a sectional elevation of the same on the lines $x$ $x$ of Fig. 1, and Fig. 3 is a sectional plan view of the same on the lines $y$ $y$ of Fig. 2.

The power drilling-machine used in connection with my improved frame is secured in any desired manner to the bars A A', united at the top by the cross-piece B, provided with the point B'. To the lower part of the bars A A' is bolted the cylinder C, provided near its upper closed end with the inlet-pipe D, having a valve, D'. A branch pipe, E, leads into the pipe D, and is provided with a valve, E'. A short distance below the inlet-pipe D is placed the outlet cock or valve F. In the cylinder C operates the piston G, having a suitable packing, G', near its upper end, and provided on its lower end with a base plate or block, H, from which projects downwardly the point H'.

The piston G is provided with the ratchet-teeth I, which engage with the pawl J, pivoted to the lower end of the cylinder C. A vertical groove, K, is also formed on the piston G, parallel with the ratchet-teeth I, and into it projects a bolt, L, screwing in the cylinder C. The lower part of the cylinder C is provided with a number of apertures, M, covered on the outside by a wire-netting, N.

The operation is as follows: The inlet-pipe D is connected by means of a hose or pipe with a reservoir of compressed air, (or other source of supply,) which is to operate the drilling-machine. A hose or pipe connects the latter with the branch pipe E, so that the compressed air from the reservoir supplies both the cylinder C and the drilling-machine supported on the bars A and A'. When the frame is in a closed position, then the lower end of the cylinder C rests on the block H, and if it is now desirable to set the frame up in a mine; for instance, so as to form a solid support for the drilling-machine, then the cock or valve F is closed and the valve D' is opened, which permits the compressed air to enter the cylinder above the piston G, and the block H rests on the ground. Then the compressed air forces the cylinder C and the bars A A', carrying the drilling-machine, upward until the cross-bar B rests against the roof of the mine. The points B' and H' enter the ground at the roof and bottom part of the mine or at the sides, and thus hold the frame firmly attached in the mine. The pawl J on the cylinder C, engaging the ratchet-teeth I on the piston G, prevents the downward movement of the cylinder C, and the bolt L, engaging the groove K, prevents a turning of the piston G in the cylinder C. If the cylinder C in its upward movement passes so far up that the apertures M come above the upper end of the piston G, then a further upward motion of the cylinder is prevented, as the compressed air in the cylinder C escapes through the apertures M. The cylinder C can be let down by first disengaging the pawl J from the ratchet-teeth I, and then cutting off the supply of compressed air by closing the valve D', and when the operator then opens the valve F the compressed air in the cylinder C is discharged. As the valve or stop-cock F is placed a short distance below the pipe D, an air-cushion is formed between the upper end of the piston G and the head of the cylinder C.

It will be seen that the frame can be set up in an instant, thus avoiding the troublesome work of adjusting the frame by screws and other devices, as heretofore practiced.

Having thus described my invention, what I claim as new, and desire to secure by Letters Patent, is—

1. In a frame for power drilling-machines, the cylinder having an inlet-pipe provided with a valve, a stop-cock, and a pawl pivoted at one end of the cylinder, in combination with the piston G, operating in the said cylinder and provided with rack-teeth engaged by the said pawl, substantially as and for the purpose set forth.

2. In a frame for power drilling-machines, the cylinder having apertures near one end and an inlet-pipe provided with a valve, a stop-cock, and a pawl pivoted on one end of the cylinder, in combination with the piston operating in said cylinder and carrying rack-teeth engaged by said pawl, and the base-plate having a point, substantially as and for the purpose set forth.

3. In a frame for power drilling-machines, the cylinder C, having the apertures M and provided with the inlet-pipe D, having a valve, D', the stop-cock F, attached to the said cylinder C, the side bars, A and A', fastened to the cylinder C, and the cross-bar B, having point B', in combination with the piston G and the base-plate H, having the point H', substantially as shown and described.

4. In a frame for power drilling-machines, the cylinder C, having the apertures M, covered by wire-netting N, the inlet-pipe D, having a valve, D', the stop-cock F, and the pawl J, pivoted on the lower end of the cylinder, in combination with the piston G, operating in the said cylinder C, the rack-teeth I, formed on the said piston and engaging the pawl J, and the base-plate H, having the point H', substantially as shown and described.

5. In a frame for power drilling-machines, the cylinder C, the bolt L, and the pawl J, pivoted on the said cylinder, in combination with the piston G, having the groove K, the teeth I on the said piston and engaging the pawl J, and the base-plate H, having the point H', substantially as shown and described.

JOHN SHAW WALLACE.

Witnesses:
W. B. BROOKS, Jr.,
ALEX. BEATTIE.